(12) United States Patent
Sahouria et al.

(10) Patent No.: US 8,234,599 B2
(45) Date of Patent: Jul. 31, 2012

(54) USE OF GRAPHS TO DECOMPOSE LAYOUT DESIGN DATA

(76) Inventors: Emile Y. Sahouria, Sunyvale, CA (US); Petr E. Glotov, Pinole, CA (US)

( * ) Notice: Subject to any disclaimer, the term of this patent is extended or adjusted under 35 U.S.C. 154(b) by 583 days.

(21) Appl. No.: 12/397,321

(22) Filed: Mar. 3, 2009

(65) Prior Publication Data
US 2010/0229145 A1 Sep. 9, 2010

(51) Int. Cl.
*G06F 17/50* (2006.01)
(52) U.S. Cl. ............ 716/55; 716/104; 716/126; 716/139
(58) Field of Classification Search .................... 716/55, 716/104, 126, 139
See application file for complete search history.

(56) References Cited

U.S. PATENT DOCUMENTS
7,580,815 B2 * 8/2009 Kawakami et al. ............... 703/2
* cited by examiner

*Primary Examiner* — Thuan Do
(74) *Attorney, Agent, or Firm* — Mentor Graphics Corporation

(57) ABSTRACT

Techniques are disclosed for determining if the decomposition of layout design data is feasible, and for optimizing the segmentation of polygons in decomposable layout design data. Layout design data is analyzed to identify the edges of polygons that should be imaged by separate lithographic masks. In addition, proposed cut paths are generated to cut the polygons in the layout design data into a plurality of polygon segments. Once the separated edges and cut paths have been selected, a conflict graph is constructed that reflects these relationships. Next, a dual of the conflict graph is constructed. This dual graph will have a corresponding separation dual graph edge for each separated polygon edge pair in the layout design data. The dual graph also will have a corresponding cut path dual graph edge for each proposed cut path generated for the layout design data. After the dual graph has been constructed, it is analyzed to determine which of the proposed cut paths should be kept and which should be discarded. The layout design data is then modified to include the cut paths corresponding to the selected cut path dual graph edges. Alternately or additionally, separate sets of layout design data may be decomposed from original layout design data using the selected cut paths.

24 Claims, 12 Drawing Sheets

USE OF GRAPHS TO DECOMPOSE LAYOUT DESIGN DATA

RELATED APPLICATIONS

This application claims priority under 35 U.S.C. §120 to U.S. patent application Ser. No. 12/390,306, filed on Feb. 20, 2009, entitled "Use Of Graphs To Decompose Layout Design Data" and naming Emile Y. Sahouria and Petr Glotov as inventors, which application in turn claims priority under 35 U.S.C. §119 to U.S. Provisional Patent Application No. 61/030,100, filed on Feb. 20, 2008, entitled "Use Of Graphs To Decompose Layout Design Data" and naming Emile Y. Sahouria and Petr Glotov as inventors, both of which applications are incorporated entirely herein by reference.

FIELD OF THE INVENTION

The present invention is directed to the use of graphs to decompose the geometric elements in a layout design. Various aspects of the invention may be particularly beneficial for partitioning geometric elements in a layer of a layout design data into separate groups. The groups can then be used to create complementary masks for use in a double-patterning manufacturing process.

BACKGROUND OF THE INVENTION

Electronic circuits, such as integrated microcircuits, are used in a variety of products, from automobiles to microwaves to personal computers. Designing and fabricating microcircuit devices typically involves many steps, known as a "design flow." The particular steps of a design flow often are dependent upon the type of microcircuit, its complexity, the design team, and the microcircuit fabricator or foundry that will manufacture the microcircuit. Typically, software and hardware "tools" verify the design at various stages of the design flow by running software simulators and/or hardware emulators, and errors in the design are corrected or the design is otherwise improved.

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. Preliminary timing estimates for portions of the circuit may be made at this stage, using an assumed characteristic speed for each device. In addition, the relationships between the electronic devices are analyzed, to confirm that the circuit described by the device design will correctly perform the desired functions. This analysis is sometimes referred to as "formal verification."

Once the relationships between circuit devices have been established, the design is again transformed, this time into a physical design that describes specific geometric elements. This type of design often is referred to as a "layout" design. The geometric elements, which typically are polygons, define the shapes that will be created in various materials to manufacture the circuit. Typically, a designer will select groups of geometric elements representing circuit device components (e.g., contacts, gates, etc.) and place them in a design area. These groups of geometric elements may be custom designed, selected from a library of previously-created designs, or some combination of both. Lines are then routed between the geometric elements, which will form the wiring used to interconnect the electronic devices. Layout tools (often referred to as "place and route" tools), such as Mentor Graphics' IC Station or Cadence's Virtuoso, are commonly used for both of these tasks.

With a layout design, each physical layer of the circuit will have a corresponding layer representation in the design, and the geometric elements described in a layer representation will define the relative locations of the circuit device components that will make up a circuit device. Thus, the geometric elements in the representation of an implant layer will define the regions where doping will occur, while the geometric elements in the representation of a metal layer will define the locations in a metal layer where conductive wires will be formed to connect the circuit devices. Typically, a designer will perform a number of analyses on the layout design. For example, the layout design may be analyzed to confirm that it accurately represents the circuit devices and their relationships as described in the device design. The layout design also may be analyzed to confirm that it complies with various design requirements, such as minimum spacings between geometric elements. Still further, the layout design may be modified to include the use of redundant geometric elements or the addition of corrective features to various geometric elements, to counteract limitations in the manufacturing process, etc.

In particular, the design flow process may include one or more resolution enhancement technique (RET) processes. These processes will modify the layout design data, to improve the usable resolution of the reticle or mask created from the design in a photolithographic manufacturing process. One such family of resolution enhancement technique (RET) processes, sometimes referred to as optical proximity correction (OPC) processes, may add features such as serifs or indentations to existing layout design data in order to compensate for diffractive effects during a lithographic manufacturing process. For example, an optical proximity correction process may modify a polygon in a layout design to include a "hammerhead" shape, in order to decrease rounding of the photolithographic image at the corners of the polygon.

After the layout design has been finalized, it is converted into a format that can be employed by a mask or reticle writing tool to create a mask or reticle for use in a photolithographic manufacturing process. Masks and reticles typically are made using tools that expose a blank reticle or mask substrate to an electron or laser beam (or to an array of electron beams or laser beams). Most mask writing tools are able to only "write" certain kinds of polygons, however, such as right triangles, rectangles or other trapezoids. Moreover, the sizes of the polygons are limited physically by the maximum beam (or beam array) size available to the tool. Accordingly, larger geometric elements in the layout design, or geometric elements that are not right triangles, rectangles or trapezoids (which typically are a majority of the geometric elements in a layout design) must be "fractured" into the smaller, more basic polygons that can be written by the mask or reticle writing tool. This process sometimes is referred to as "mask data preparation."

Once a layout design has been fractured into shots, then the fractured layout design data can be converted to a format compatible with the mask or reticle writing tool. Examples of such formats are MEBES, for raster scanning machines manufactured by ETEC, an Applied Materials Company, and various vector scan formats for Nuflare, JEOL, and Hitachi machines, such as VSB11 or VSB12. The written masks or reticles then can be used in a photolithographic process to expose selected areas of a wafer to light or other radiation in order to produce the desired integrated circuit devices on the wafer.

To meet the demand for more powerful microcircuits, designers have regularly increased the average density of devices in a conventional microcircuit. For example, the area that might once have contained 100 transistors may now be required to contain 1,000 or even 10,000 transistors. Some current microcircuit designs call for microcircuit devices to be packed so closely that it may be difficult to properly manufacture adjacent device components in a single lithographic process. For example, a current microcircuit design may specify a series of parallel conductive lines positioned so closely that a conventional mask writer cannot resolve the pitch between the lines.

To address this issue, the structures in a layer of a microcircuit device are now sometimes formed using two or more separate lithographic processes. This technique, referred to as "double patterning," partitions a layout design into two or more groups, each of which is then used to form a complementary lithographic mask pattern. Thus, if a layout design calls for a series of closely-spaced parallel connective lines, this target pattern may be partitioned so that alternating lines are actually formed by different masks in separate lithographic processes.

Because this "double patterning" technique typically is employed to ensure a minimum separation between adjacent structures in a microcircuit layer, the proximity relationships between the pieces of a target pattern may be used to define the partition. For example, a user may specify that pairs of edges in the target pattern must be imaged by different masks. This "separation directive" is then employed by a decomposition function to partition the target pattern so that new mask pattern conforms to the constraints given by the separation directive. Typically, this will require cutting the polygons making up a target pattern into segments. It is often difficult, however, to determine how the polygons in the target pattern should be segmented, i.e., where to cut the polygons. Ideally, the polygons should be segmented so that the resulting mask patterns will satisfy the separation directive while creating the smallest number of different polygon segments.

BRIEF SUMMARY OF THE INVENTION

Aspects of the invention relate to techniques for determining if the decomposition of layout design data is feasible. Other aspects of the invention relate to techniques for optimizing the segmentation of polygons in decomposable layout design data. According to various implementations of the invention, layout design data is analyzed to identify the edges of polygons that should be imaged by separate lithographic masks. These "separated" edges may be automatically or manually specified using, for example, a separation directive. In addition, proposed cut paths are generated to cut the polygons in the layout design data into a plurality of polygon segments.

Once the separated edges and cut paths have been selected, a conflict graph is constructed that reflects these relationships. More particularly, each polygon segment is represented by a node in the conflict graph. Nodes representing polygon segments that have separated polygon edges are connected by a first type of graph edge, referred to hereafter as a separation graph edge. That is, if a polygon segment has an edge that should be formed with a different mask than the edge of an adjacent polygon segment, the nodes representing those polygon segments will be linked in the conflict graph by a separation graph edge. Nodes representing abutting polygon segments similarly are connected by a second type of edge, referred to hereafter as a cut path graph edge. Thus, each pair of separated polygon edges will have a corresponding separation graph edge in the conflict graph, and each cut path will have a corresponding cut path graph edge in the conflict graph.

Next, a dual of the conflict graph is constructed. This dual graph will have separation dual graph edges corresponding to the separation graph edges of the conflict graph. It also will have cut path dual graph edges corresponding to the cut path graph edges of the conflict graph. Thus, the dual graph will have a corresponding separation dual graph edge for each separated polygon edge pair in the layout design data. The dual graph also will have a corresponding cut path dual graph edge for each proposed cut path generated for the layout design data.

After the dual graph has been constructed, it is analyzed to determine which of the proposed cut paths should be kept and which should be discarded. First, those nodes in the dual graph that have an odd number of incident separation dual graph edges (referred to herein as "odd" nodes) are identified, as are the nodes that have an even number of incident separation dual graph edges (referred to herein as "even" nodes). After these nodes have been identified, then the cut path dual graph edges that pass through even numbers of even nodes to join pairs of odd nodes are selected. According to various implementations of the invention, for example, this is accomplished by assigning weights to the cut path dual graph edges and selecting the cut path dual graph edges that make up the cut path dual graph edge minimum-weight T-join of the odd nodes.

The selected cut path dual graph edges correspond to the cut paths that should be used to decompose the layout design data. With some implementations of the invention, the layout design data is modified to include the cut paths corresponding to the selected cut path dual graph edges. Still other implementations of the invention may alternately or additionally create separate sets of layout design data decomposed from original layout design data using the selected cut paths. For example, some implementations of the invention may output a first set of layout design data to form a first mask, and a second set of layout design data used to form a second mask complementary to the first mask. Both masks can then be used to form all of the structures described in the original layout design data.

DETAILED DESCRIPTION OF THE INVENTION

Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 4. This operating environment is only one example of a suitable operating environment, however, and is not intended to suggest any limitation as to the scope of use or functionality of the invention.

Figure 1:
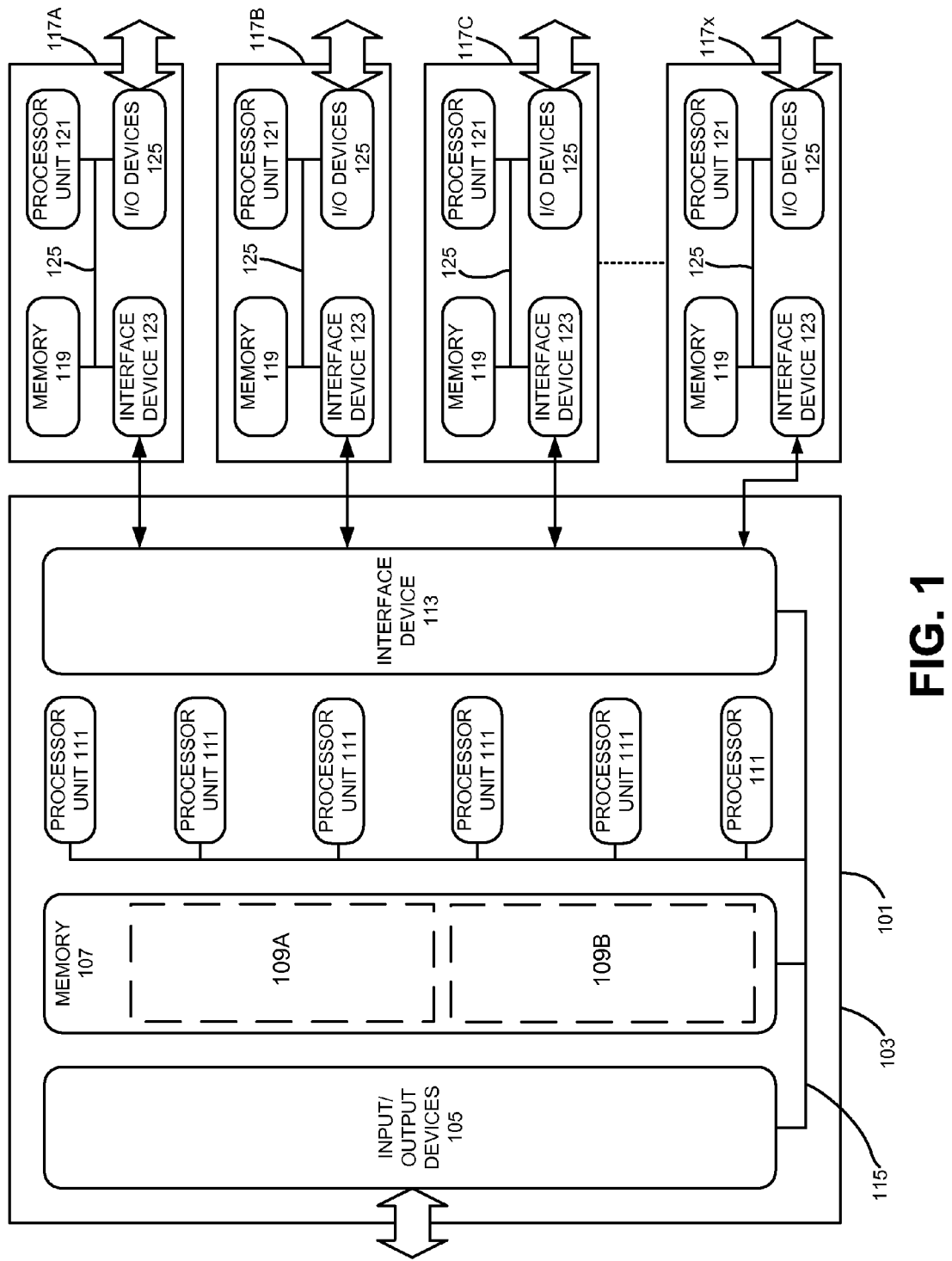
FIG. 1 illustrates a computing system that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
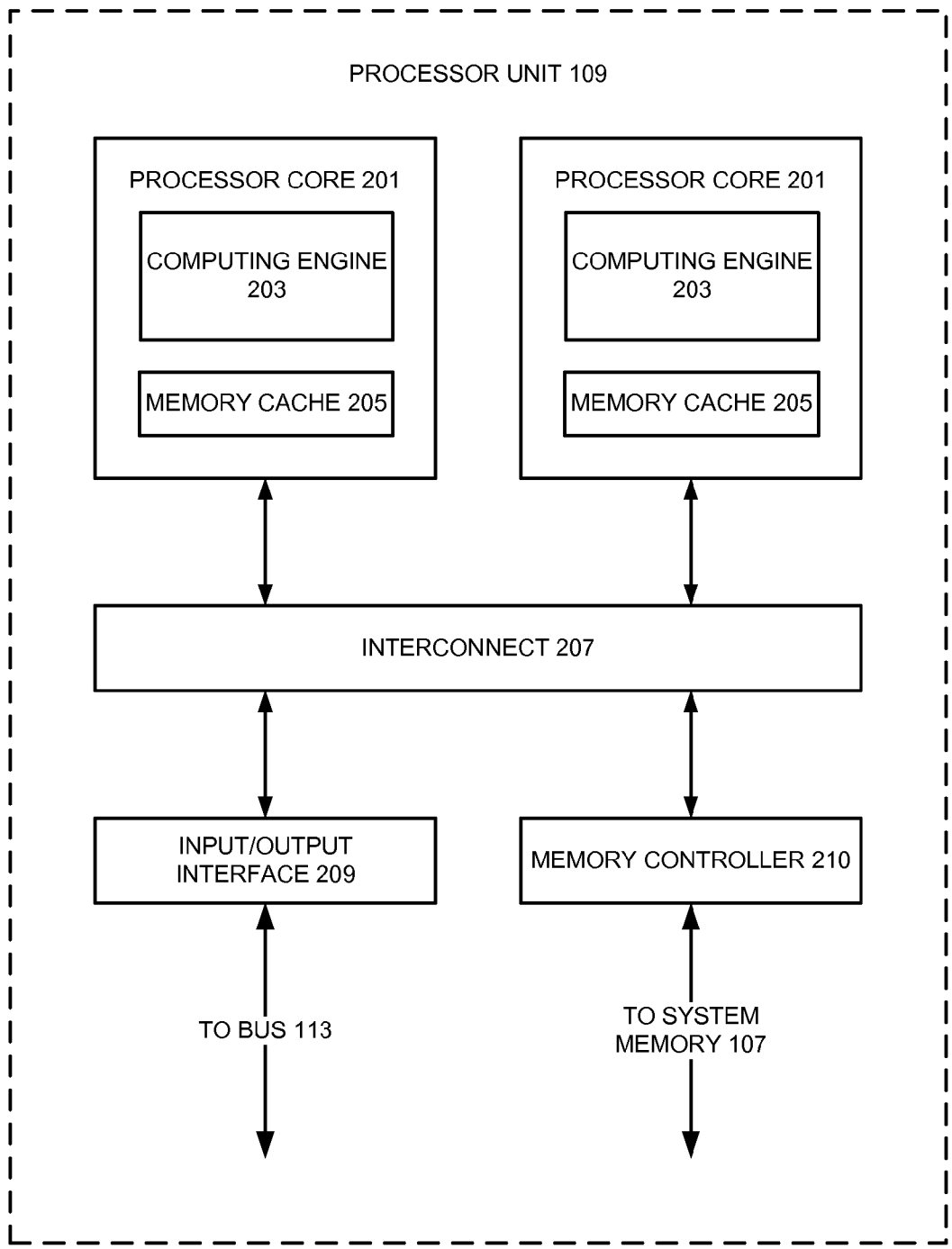
FIG. 2 illustrates an example of a multi-core processor unit that may be used to implement various embodiments of the invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 428×428 bit registers, four single-precision floating point computational units, four integer computational units, and a 556 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Layout Design Data Decomposition Tool

Figure 3:
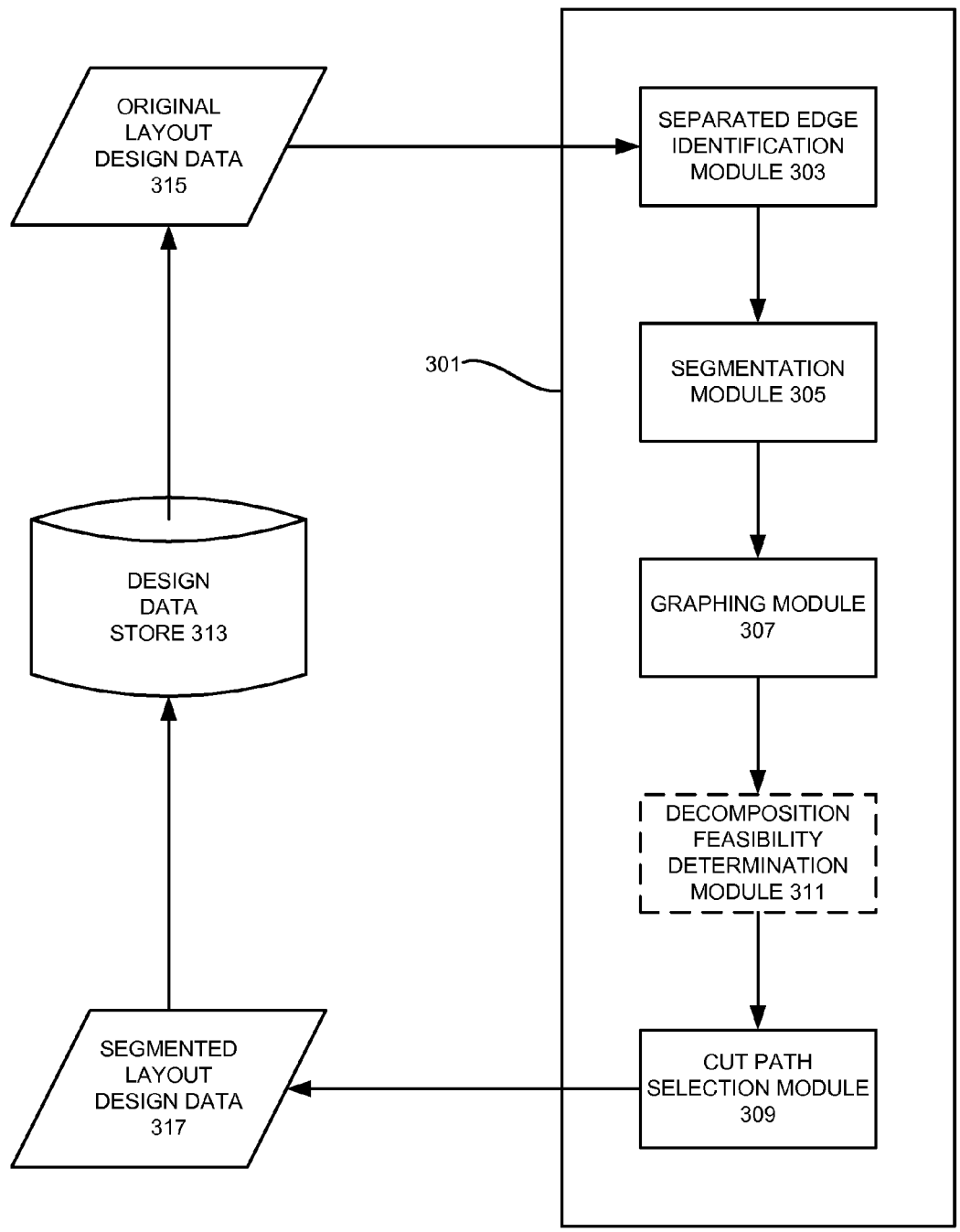
FIG. 3 illustrates an example of a circuit layout design segmentation tool that may be implemented according to various embodiments of the invention.

FIG. 3 illustrates an example of a layout design data decomposition tool 301 that may be implemented according to various examples of the invention. As seen in this figure, the layout design data decomposition tool 301 includes a separated edge identification module 303, a segmentation module 305, a graphing module 307, and a cut path selection module 309. In addition, various implementations of the invention may include an optional decomposition feasibility determination module 311. As previously noted, various examples of the invention may be implemented by a multiprocessor computing system, such as the multiprocessor computing system 101 illustrated in FIG. 1. Accordingly, one or more components of each of the separated edge identification module 303, the segmentation module 305, the graphing module 307, the cut path selection module 309, and the decomposition feasibility determination module 311 may be implemented using one or more processors in a multiprocessor computing system's master computer, such as the master computer 103, one or more servant computers in a multiprocessor computing system, such as the servant computers 117, or some combination of both. It also should be appreciated that, while the separation directive designation module 303, the segmentation module 305, the graphing module 307, the cut path selection module 309 and the decomposition feasibility determination module 311 are shown as separate units in FIG. 3, a single servant computer (or a single processor within a master computer) may be used to implement two or more of these modules at different times.

The layout design data decomposition tool 301 may work with a design data store 313. The design data store 313 may be any data storage device that is capable of storing layout design data and accessible to the layout design data decomposition tool 301. For example, the design data store 313 may be a magnetic disk drive, a rewritable optical disk drive, a "punch" type memory device, a holographic memory device, etc. Of course, while a single design data store 313 device is illustrated in FIG. 3, alternate examples of the invention may employ two or more separate memory storage devices working in concert to form the design data store 313. With various examples of the invention, the design data store 313 may store layout design data as part of a database for storing design data for use in one or more other electronic design automation processes. For example, the design data store 313 may store the layout design data as part of a hierarchical database used in conjunction with one or more physical verification or resolution enhancement technique tools, such as the family of Calibre software design tools available from Mentor Graphics Corporation of Wilsonville, Oreg. It should be noted that, with various examples of the invention, the layout design data decomposition tool 301 may be implemented as part of another electronic design automation tool, such as a resolution enhancement technique tool, a layout design rule check tool, a layout design-for-manufacturability tool, etc.

As will be discussed in more detail below, the layout design data decomposition tool 301 obtains initial layout design data 315. As shown in FIG. 3, the layout design data decomposition tool 301 may obtain the initial layout design data 315 from the design data store 313. With various examples of the invention, the layout design data decomposition tool 301 may receive the initial layout design data 315 from the design data store 313 either by actively retrieving the initial layout design data 315, or by being provided the initial layout design data 315 by a separate entity, such as a user, an operating system, a separate executable software program, or some combination thereof. Of course, with various examples of the invention, the initial layout design data 315 may also be obtained from a different source than the design data store 313. For example, the initial layout design data 315 may be provided to the layout design data decomposition tool 301 by a separate entity, such as a user, an operating system, a separate executable software program, or some combination thereof. Still further, the initial layout design data 315 may be obtained from a variety of sources, which may or may not include the design data store 313.

The layout design data decomposition tool 301 decomposes the initial layout design data 315 to produce segmented layout data 317. As will be described in more detail below, the separated edge identification module 303 identifies separated polygon edges in the initial layout design data 315, while the segmentation module 305 generates proposed cut paths to segment the polygons in the initial layout design data 315. The graphing module then constructs a conflict graph based upon the separated segmented polygons, the cut paths generated by the segmentation module 305 to segment the polygons, and the polygon edges identified by the separation directive designation module 303. The graphing module 307 also constructs a dual of the conflict graph. With some examples of the invention, the decomposition feasibility determination module 311 will employ the dual graph to determine the feasibility of decomposing the initial layout design data 315. The cut path selection module 309 then uses the information provided by the dual graph to determine which of the proposed cut paths should be kept and which should be discarded.

Based upon the selected cut paths, the layout design data decomposition tool 301 will output segmented layout design data 317. With some implementations of the invention, the segmented layout data 317 may be a single set of layout design data that includes the selected cut paths. With still other implementations of the invention, however, the segmented layout data 317 may include two or more separate sets of layout design data that have been decomposed according to the selected cut paths. The operation of the layout design data decomposition tool 301 will be discussed in more detail below with regard to the flow chart illustrated in FIG. 4.

Identification of Separated Geometric Edges

Figure 4A:
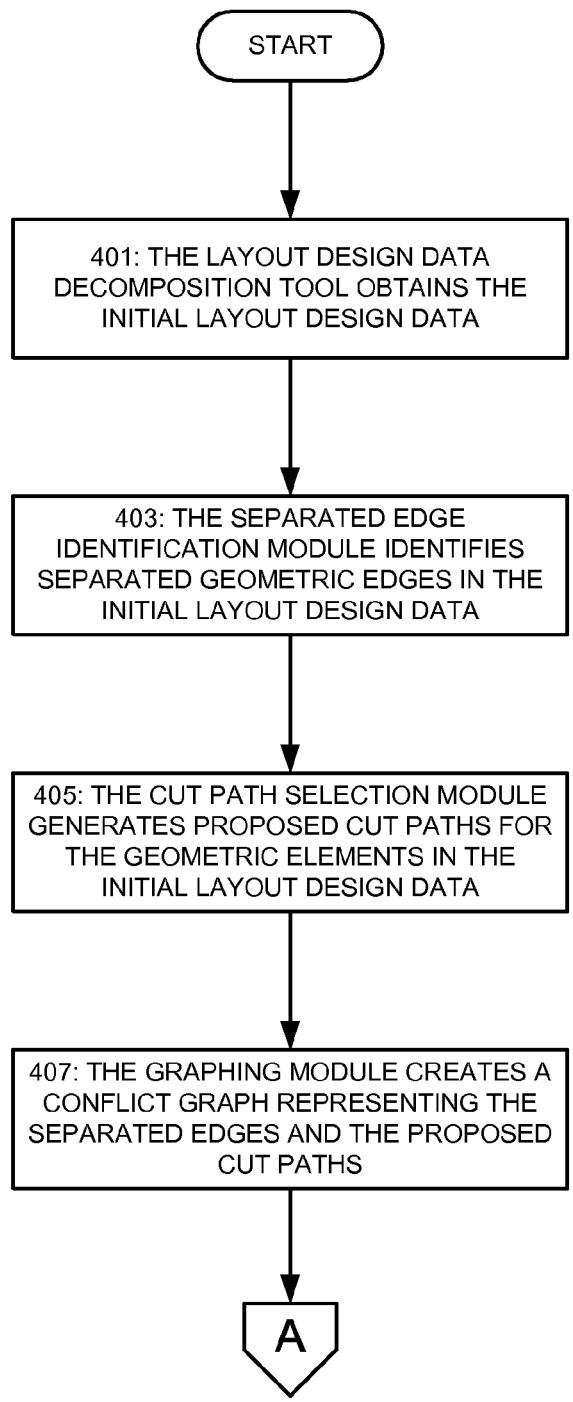
FIGS. 4A and 4B illustrate a flowchart showing the operation of a circuit layout design segmentation tool that may be implemented according to various embodiments of the invention.
Figure 4B:
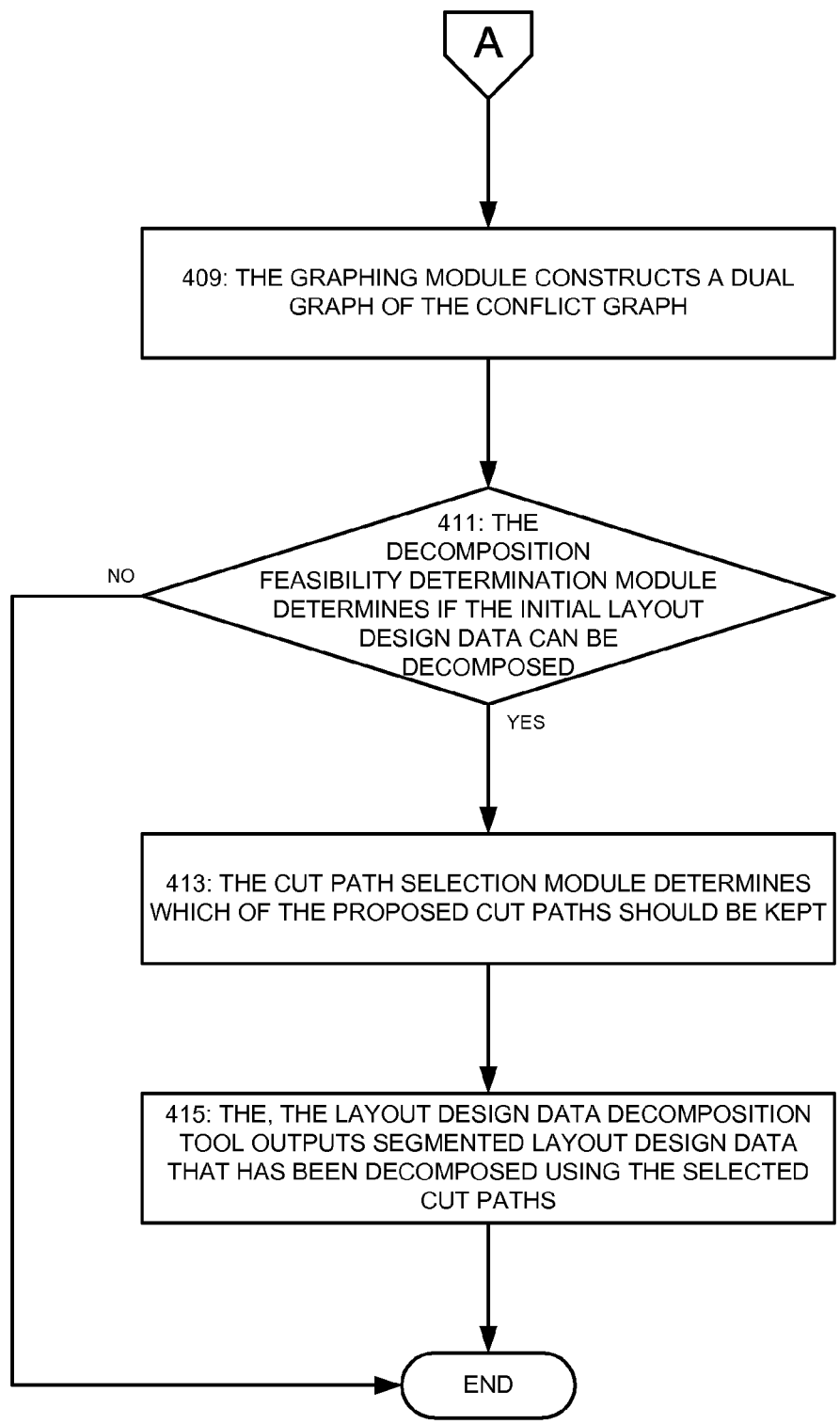

Referring now to FIG. 4, in step 401 the layout design data decomposition tool 301 obtains the initial layout design data 315. As used herein, the term "design" is intended to encompass data describing an entire microdevice, such as an integrated circuit device or a micro-electromechanical system (MEMS) device. This term also is intended to encompass a smaller group of data describing one or more components of an entire microdevice, however, such as a layer of an integrated circuit device, or even a portion of a layer of an integrated circuit device. Still further, the term "design" also is intended to encompass data describing more than one microdevice, such as data to be used to create a mask or reticle for simultaneously forming multiple microdevices on a single wafer. The layout design data may be in any desired format, such as, for example, the Graphic Data System II (GDSII) data format or the Open Artwork System Interchange Standard (OASIS) data format proposed by Semiconductor Equipment and Materials International (SEMI). Other formats include an open source format named Open Access, Milkyway by Synopsys, Inc., and EDDM by Mentor Graphics, Inc.

Figure 5:
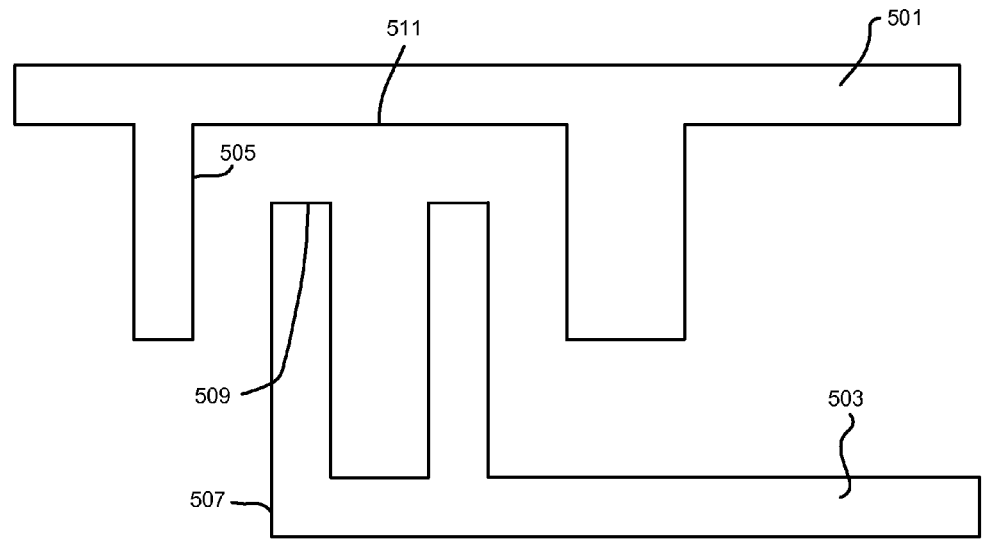
FIG. 5 illustrates an example of polygons in layout design data.

As will be appreciated by those of ordinary skill in the art, layout design data will include one or more geometric elements to be written to a mask or reticle. For conventional mask or reticle writing tools, the geometric elements typically will be polygons of various shapes. Thus, the layout design data usually include polygon data describing the features of polygons in the design. With various examples of the invention, the layout design data may include unfractured polygon data, previously-fractured polygon data, or some combination thereof. For example, the initial layout design data 315 may include geometric elements such as the polygons 501 and 503 shown in FIG. 5.

As will be appreciated by those of ordinary skill in the art, however, double patterning is a technique for using two or more complementary lithographic masks to form structures in a single layer of material (for example, a single conductive layer of material). It therefore should be understood that the layout design data decomposition tool 301 decomposes layout design data describing structures to be formed in a single layer of material. Accordingly, the initial layout design data 315 typically will describe structures to be formed in a single layer of material, or will be data that can be differentiated into sets of data that each describes structures to be formed in a single layer of material.

In addition, the initial layout design data 315 may include information used to interpret the data describing the structures, or to specify special treatment for some subset of the structure data. For instance, it may be undesirable to generate a cut path in a polygon representing a transistor gate. Accordingly, some type of prohibition information may be included with that polygon to indicate to the tool 301 that no cut path may be generated within that polygon.

Next, in step 403, the separated edge identification module 303 identifies separated geometric or polygon edges in the initial layout design data 315. As used herein, the term "separated edges" refers to geometric edges that should or must be formed using separate lithographic masks. For example, referring back to FIG. 5, the edge 505 may be too close to edge 507 for both edges to be formed using the same lithographic mask. Similarly, edge 509 may be too close to edge 511 for both edges to be formed using the same lithographic mask.

With some implementations of the invention, the separated edges can be specified in the initial layout design data 315 before it is obtained by the layout design data decomposition tool 301. Still other implementations of the invention may allow a user to designate separated edges after the initial layout design data 315 has been obtained by the layout design data decomposition tool 301. For example, some implementations of the invention may allow a user to specify a separation directive (e.g., minimum separation width criteria) for identifying separated edges in the initial layout design data 315. The separation directive designation module 303 will then identify edges that should be designated separated edge pairs based upon the provided separation directive. With still other embodiments of the invention, another electronic design automation process may designate separated edges in the initial layout design data 315, either before or after the initial layout design data 315 has been obtained by the layout design data decomposition tool 301.

Figure 6:
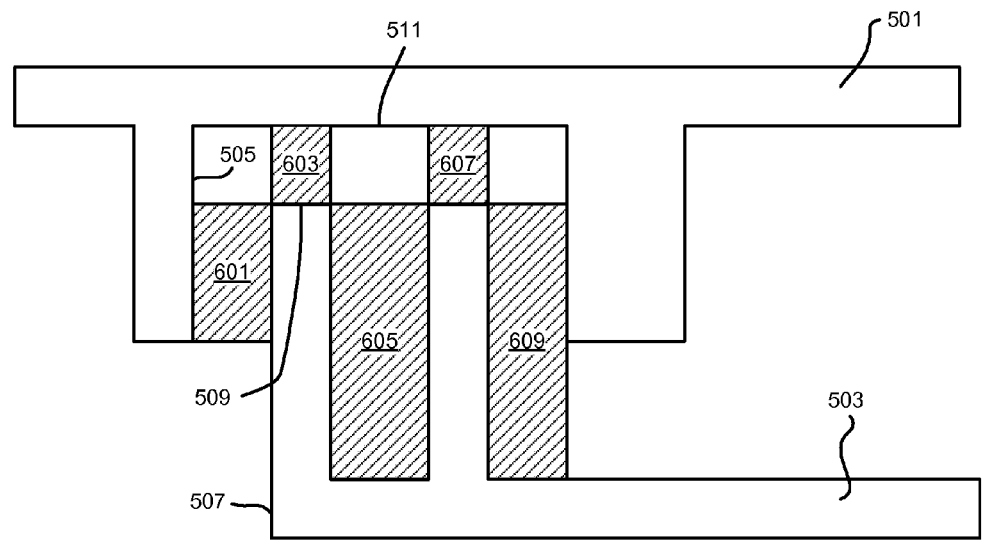
FIG. 6 illustrates the use of separation polygons that can be used according to various embodiments of the invention to indicate separated edges in the layout design data illustrated in FIG. 5.

For example, some implementations of the invention may employ a design rule check process provided by the Calibre family of electronic design automation tools (available from Mentor Graphics Corporation of Wilsonville, Oreg.) to designate separated edges. This type of design rule check process may, for example, create separation directive polygons between separated edges, such as the directive polygons 601-609 illustrated in FIG. 6. As seen in this figure, the separation directive polygon separation separates edge 505 from edge 507, designating these geometric edges (also referred to hereafter as polygon edges for ease of understanding) as separated edges. Similarly, the separation directive polygon 603 separates edge 509 from edge 511, designating these polygon edges as separated edges. Of course, any other desired technique can be used to designate separated edges, such as a lookup table, linking structures, or the like.

Generation of Proposed Cut Paths

In step 405, the cut path selection module 309 generates proposed cut paths for the geometric elements (i.e., the polygons) in the initial layout design data 315. Any desired technique can be used to generate these proposed cut paths. With various examples of the invention, however, the cut path selection module 309 will generate proposed cut paths according to a library of cut types. These parameters of these cut types indicate the type of cuts that the segmentation module 305 should make in order to form a polygon segments that conforms to the requirements of the designated separated edges.

Figure 7A:
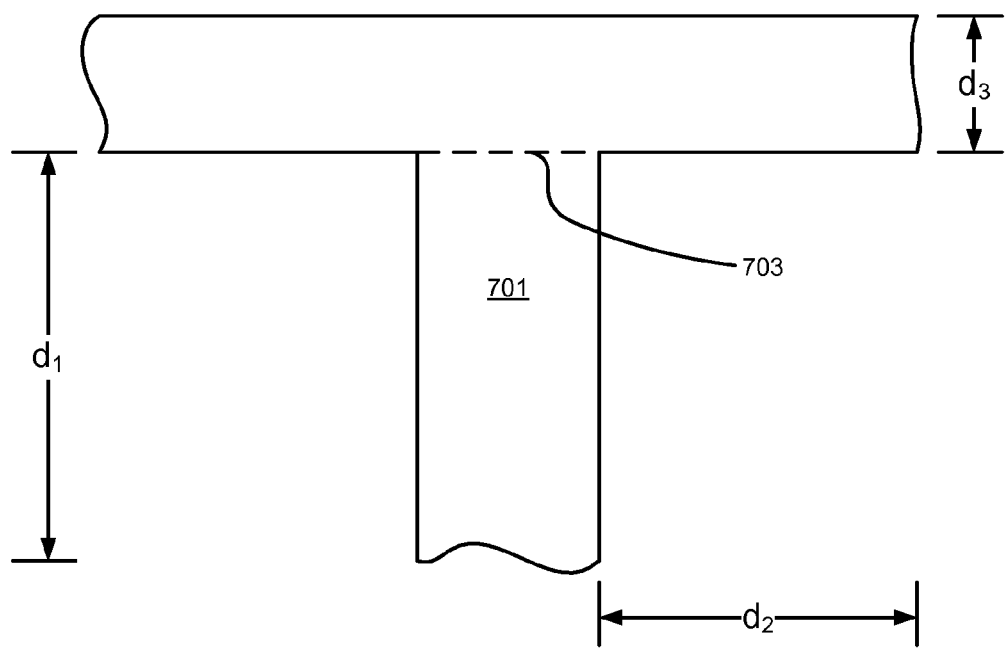
FIGS. 7A-7C illustrate examples of cut type models that can be used to determine the location of proposed cut paths according to various embodiments of the invention.
Figure 7B:
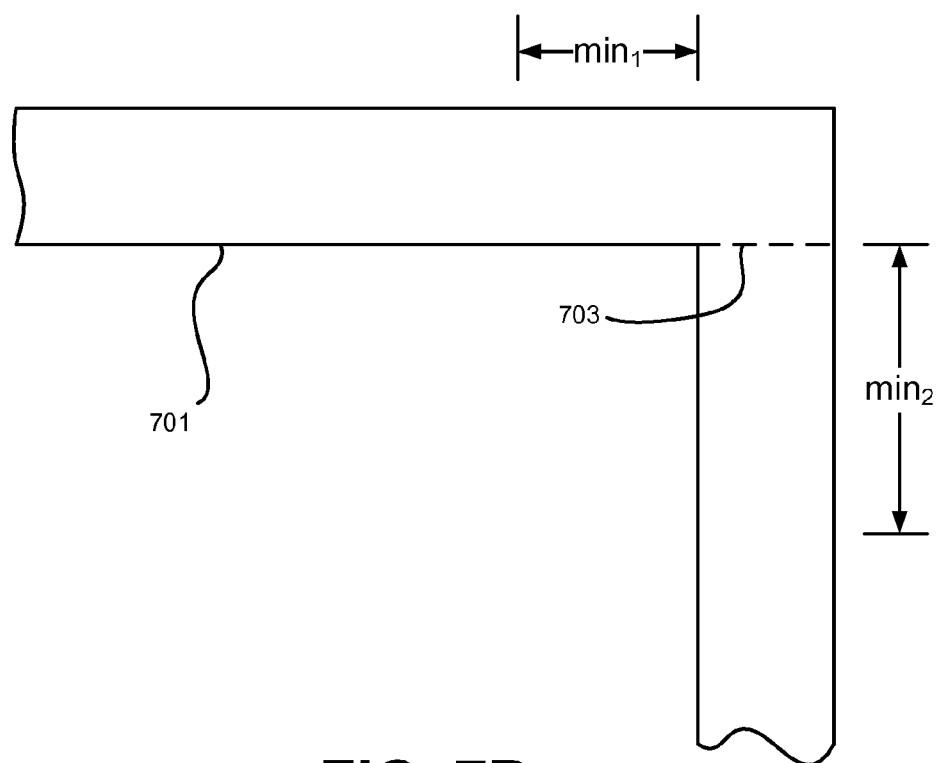
Figure 7C:
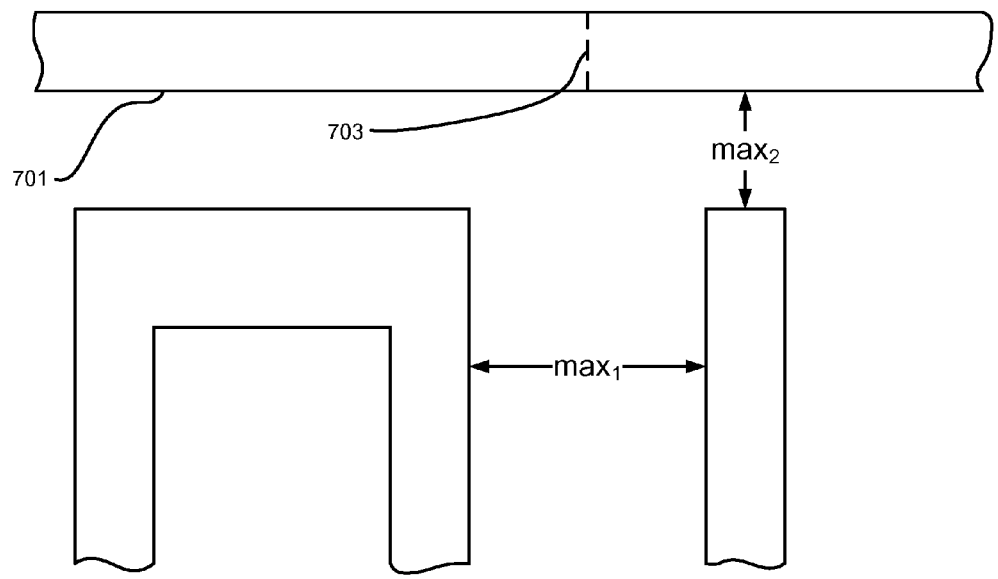

FIG. 7A illustrates one example of a cut type that may be employed according to various implementations of the invention. This cut type specifies that a polygon 701 have a proposed cut path 703 that should be made at a local "T-shaped" intersection. The geometric element 701 forms a T-shaped intersection if it consists of exactly two rectangular pieces in the configuration of FIG. 7A, where $d_1$, $d_2 \geq eps$, and $d_3 > 2*eps$, and eps is the overlay tolerance for the stepper that will be used to form the structures during a lithographic process (i.e., the maximum distance that the two exposures can be offset from each other). Of course, still other embodiments of the invention may allow a user to specify the parameters for one or more of $d_1$, $d_2$, and $d_3$. Typically, this type of "T-intersection" configuration can be efficiently and unambiguously detected in the initial layout design data 315. Of course, still other cut types, such as L-shaped intersections and π-shaped intersections (shown in FIGS. 7B and 7C, respectively), may alternately or additionally be employed. Also, as previously noted, any other desired technique, such as techniques employing process simulation, may alternately or additionally be used to determine suitable proposed cut paths.

Figure 8:
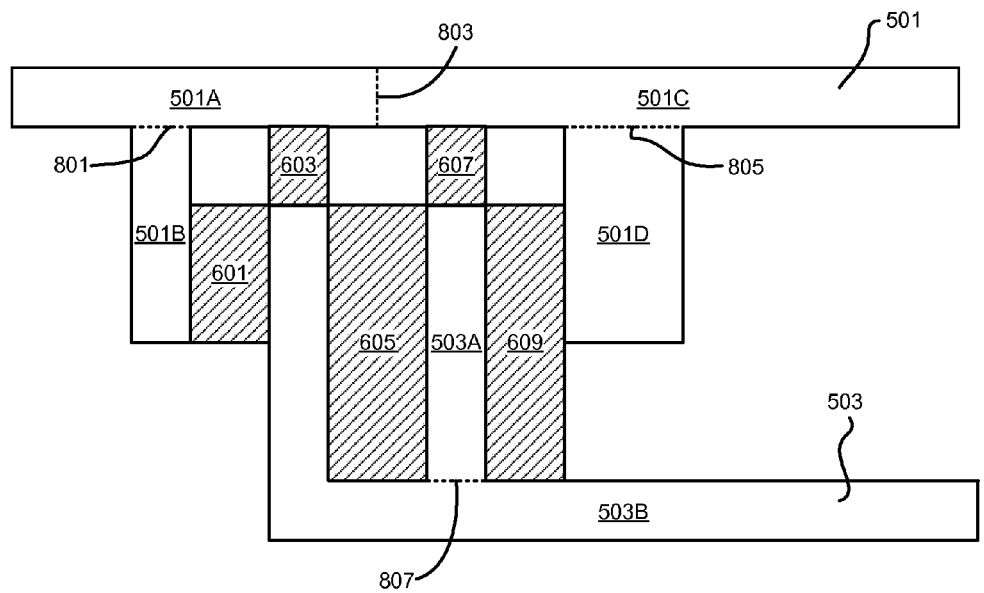
FIG. 8 illustrates proposed cut paths that can be added to the layout design data illustrated in FIG. 5 according to various embodiments of the invention.

Thus, as shown in FIG. 8, the cut path selection module 309 may generate proposed cut paths 801-807. As seen in this figure, the proposed cut paths 801-805 divide the polygon 501 into polygon segments 501A-501D, while the proposed cut path 807 divides the polygon 503 into polygon segments 503A and 503B.

It should be appreciated that, while steps 403 and 405 have been described sequentially, the two steps may be unrelated. For example, the segmentation module 305 may generate the proposed cut paths in step 405 before the separated edge identification module 303 identifies the separated edges in step 403. Alternately, the separated edge identification module 303 and the segmentation module 305 may operate on the initial layout design data 315 effectively in parallel, with the results combined for or by the graphing module 307.

Graph Construction

In step 407, the graphing module 307 creates a conflict graph representing the separated edges and the proposed cut paths. More particularly, the graphing module 307 creates a conflict graph representing the relationship between the proposed cut paths, the polygon segments created by the proposed cut paths, and the separated edges shared by different polygon segments. With various examples of the invention, each polygon segment is represented by a node in the conflict graph. If two polygon segments abut (i.e., are separated by a proposed cut path), these nodes are connected by a particular type of graph edge, referred to herein as a cut path graph edge. Thus, each proposed cut path will have a corresponding cut path edge in the conflict graph, and vice versa. Similarly, each separated edge pair will be represented by particular type of graph edge, referred to herein as a separation graph edge. Thus, nodes in the conflict graph representing polygon segments that have separated edges (i.e., polygon segments that each includes one edge of a pair of separated edges) are connected by a separation graph edge.

Figure 9:
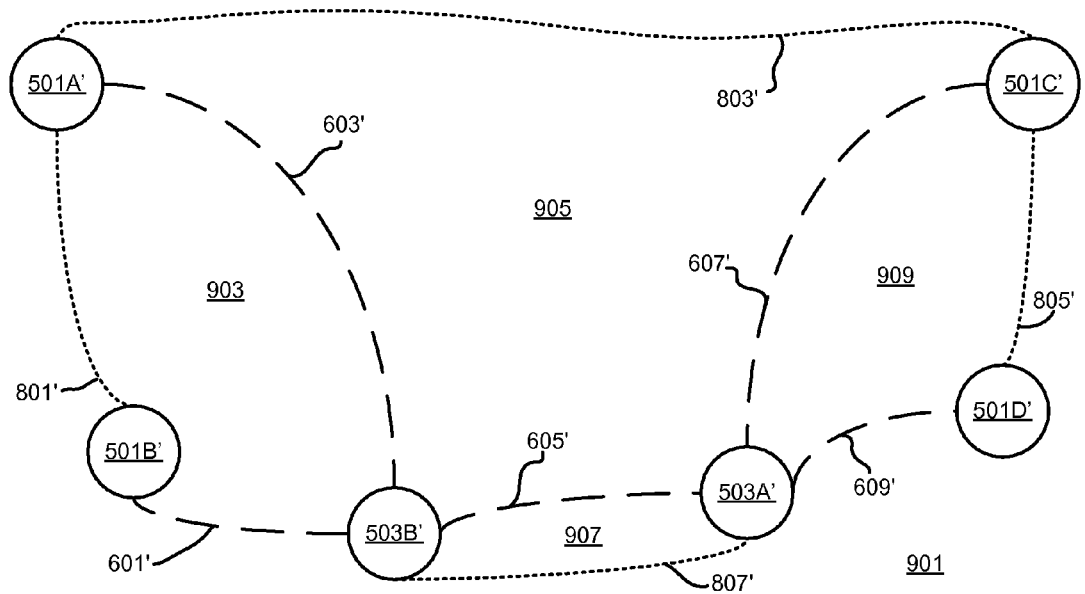
FIG. 9 illustrates an example of a conflict graph that can be constructed according to various embodiments of the invention based upon the proposed cut paths and separation polygons illustrated in FIG. 8.

FIG. 9 illustrates a conflict graph created for the layout design data, separated edges and proposed cut paths shown in FIG. 8. As seen in this figure, each polygon segment 501A-501D has a corresponding node 501A'-501D'. Similarly, the pairs of separated edges (represented in FIG. 8 by the separation directive polygons 601-609) correspond to the separation graph edges 601'-609'. The proposed cut paths 801-807 then correspond to the cut path graph edges 801'-807', respectively. Thus, the node 501A' (corresponding to the polygon segment 501A) is connected to the node 501B' (corresponding to the polygon segment 501B) by the cut path graph edge 801' (corresponding to the proposed cut path 801). Likewise, the node 501B' is connected to the node 503B' (corresponding to the polygon segment 503B) by the separation graph edge 601' (corresponding to the separation directive polygon 601). It should be noted that the node 503B' then is connected to the node 503A' (corresponding to the polygon segment 503A) by the cut path graph edge 807' (corresponding to the proposed cut path 807) and by the separation graph edge 605' (corresponding to the separation directive polygon 605).

In step 409, the graphing module 307 constructs a dual graph of the conflict graph. As known in the art, the dual graph includes dual graph edges corresponding to the graph edges of the original conflict graph. The nodes of the dual graph, however, correspond to areas bounded by the graph edges in the conflict graph. For example, as seen in FIG. 9, in the conflict graph, the separation graph edges 601' and 603' and the cut path graph edge 801' define the area 903. The separation graph edges 603'-607' and the cut path graph edge 803' then define the area 905. The separation graph edge 605' and the cut path graph edge 807' together define the area 907, while the separation graph edges 607' and 609', along with the cut path graph edge 805', define the area 909. The "outer" area 901 then is defined by the separation graph edges 601' and 609', and by each of the cut path graph edges 801'-807'.

Figure 10A:
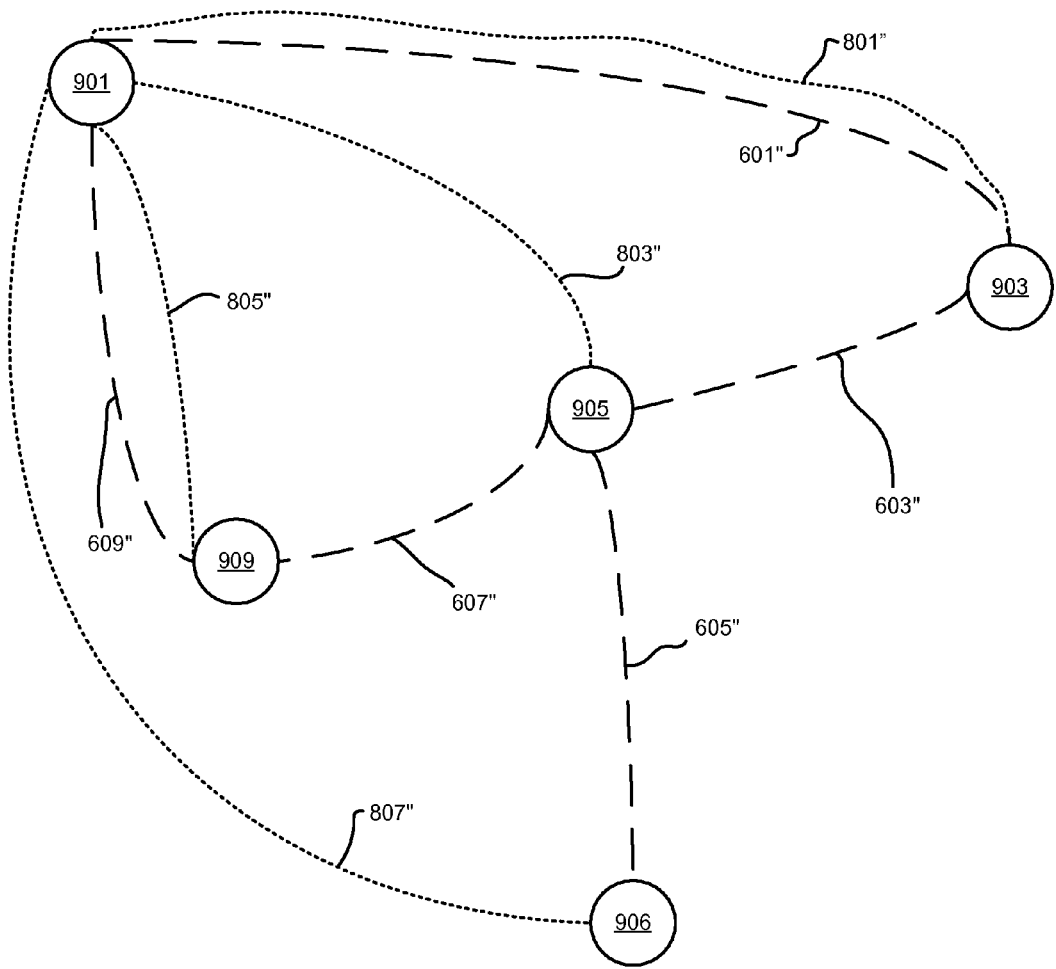
FIGS. 10A and 10B illustrate a dual graph that can be constructed from the conflict graph illustrated in FIG. 9 according to various embodiments of the invention.

FIG. 10A illustrates a dual graph that includes the nodes 901'-909' corresponding to the areas 901-909, respectively. As seen in this figure, the nodes 901-909' of the dual graph are connected by the same graph edges that defined them in the conflict graph. For example, because area 903 and 905 were separated by the separation graph edge 603' in the conflict graph, the nodes 903' and 905' are connected by the cut path graph edge 803" in the dual graph. Moreover, as will be appreciated by those of ordinary skill in the art, the cut path graph edge 803" corresponds to the cut path graph edge 803', which in turn corresponds to the cut path 803. By extension, the cut path graph edge 803" itself corresponds to the cut path 803. Thus, the dual graph represents the relationships between the proposed cut paths and the separated edges.

Decomposition Feasibility Determination

As previously noted, some implementations of the invention may include the optional decomposition feasibility determination module 311. If it does, then in step 411 the decomposition feasibility determination module 311 may use the information contained in the dual graph to determine if it is feasible to decompose the initial layout design data 315 using the proposed cut paths. For example, if the initial layout design data 315 is to be decomposed into two complementary sets of layout design data, the decomposition feasibility determination module 311 will create a subgraph of the dual graph by eliminating the cut path graph edges. If the resulting subgraph is bipartite, then the decomposition feasibility determination module 311 will determine that the initial layout design data 315 can be decomposed into two complementary sets of layout design data. That is, the decomposition feasibility determination module 311 makes the determination that, if all proposed cut paths were selected, the resulting set of target layer segments may be decomposed if and only if the separated edges do not imply any odd cycles in the dual graph. With some examples of the invention, if the decomposition feasibility determination module 311 determines that the initial layout design data 315 cannot be decomposed into two complementary sets of layout design data, then the process will skip to the end.

With still other implementations of the invention, however, the decomposition feasibility determination module 311 (or some other module if the decomposition feasibility determination module 311 is omitted) will determine a "best effort" partition for the initial layout design data 315. With these implementations, the decomposition feasibility determination module 311 may, for example, treat separation directives as edges in the dual graph, and then assign costs to these "separator" edges which are much higher than the costs of edges associated with ordinary cuts. The cut path selection module 313 then is allowed to choose separator edges as well as cut edges. If some separators edges are chosen in as "cut paths" in the solution, then the associated separation directives can be violated when the final decomposition is done to rovide a best effort decomposition.

Decomposition of the Layout Design Data

In step 413, the cut path selection module 309 determines which of the proposed cut paths should be kept in order to optimize the number of cut paths while ensuring that each of the separated edges will be formed on different masks. More particularly, the cut path selection module 309 identifies the cut path edges in the dual graph that pass through even numbers of even nodes to join pairs of odd nodes. The cut path selection module 309 then segments the initial layout design data 315 using the proposed cut paths corresponding to the identified cut path edges in the dual graph. The remaining proposed cut path edges are discarded.

For example, with some implementations of the invention, the cut path selection module 309 will identify the nodes in the dual graph having an odd number of incident dual graph separation edges. The cut path selection module 309 may also assign a weight to each of the edges in the dual graph. More particularly, the cut path selection module 309 may assign a relatively large weight, such as an essentially "infinite" value, to each of the separation graph edges in the dual graph. (The value of the separation graph edges may be, for example, a number many times larger than the observed cut path costs, but not so large that it will cause numerical problems for the system performing the analysis.) It also will assign a relatively small weight, such as zero or a finite value, to each of the cut path graph edges in the dual graph. Using these weight values, the cut path selection module 309 then will identify the dual graph cut path edges that make up the dual graph cut path edge minimum-weight T-join of the identified nodes.

Figure 11:
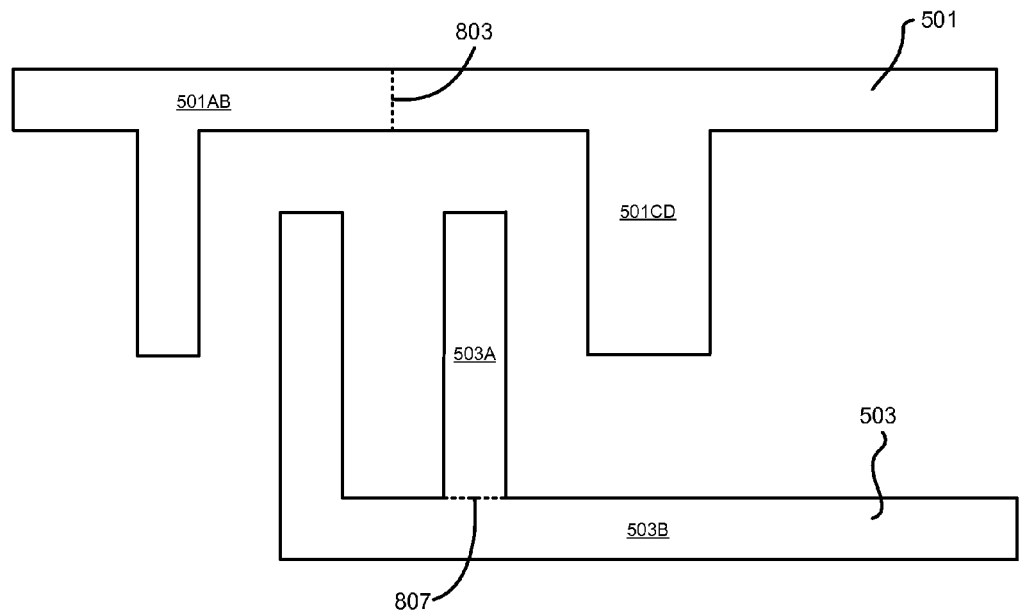
FIG. 11 illustrates cut paths selected to decompose the polygons illustrated in FIG. 6 using the dual graph illustrated in FIGS. 10A and 10B according to various embodiments of the invention.
Figure 10B:
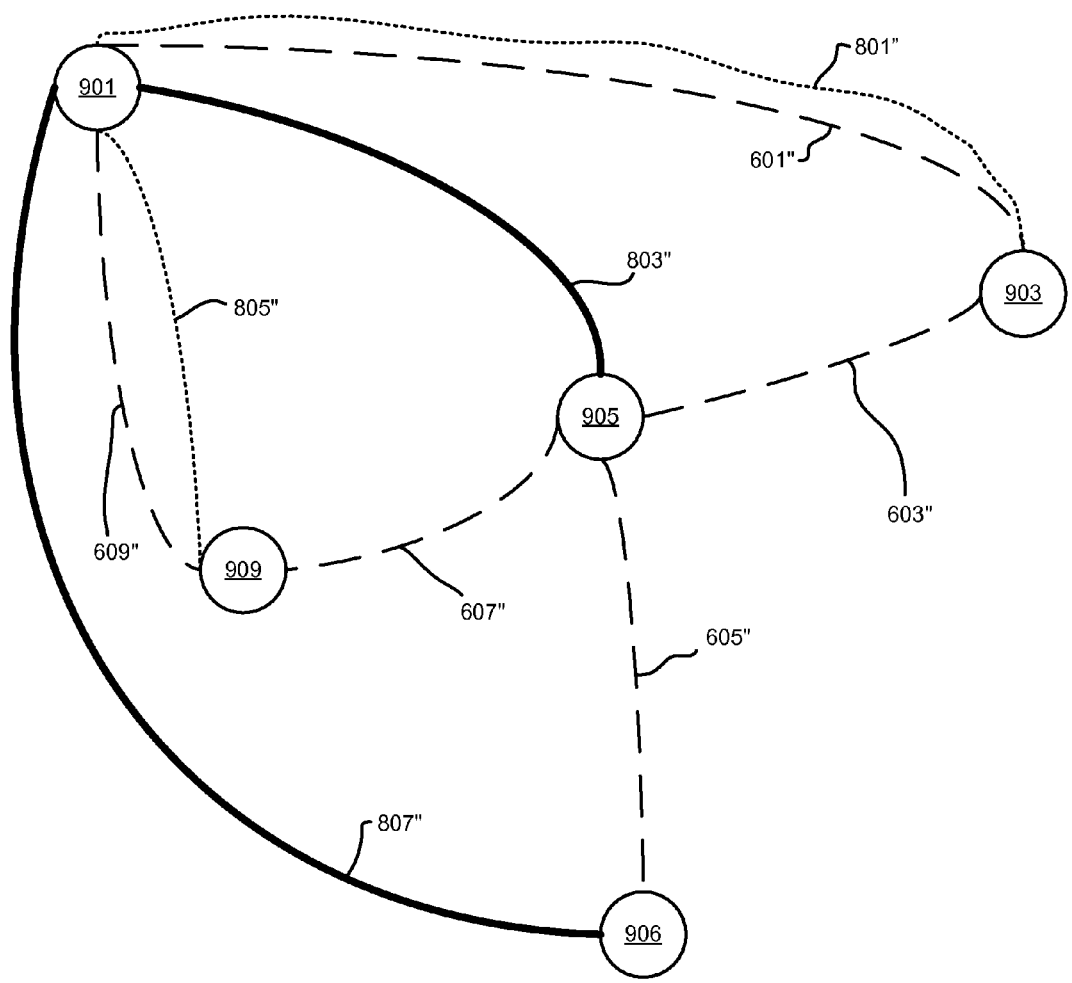

For example, with the dual graph shown in FIG. 10A, the cut path selection module 309 will select the cut path graph edges 803" and 807", as shown in FIG. 10B. The cut path selection module 309 will then decompose the layout design data 315 into complementary sets using the proposed cut paths 803 and 807, corresponding to the selected cut path graph edges 803" and 807". Thus, as shown in FIG. 11, the polygon 501 is decomposed into polygon segment 501AB and polygon segment 501CD. The polygon 503 similarly is decomposed into polygon segment 501A and polygon segment 501B.

With various examples of the invention, the cut path selection module 309 will avoid mutually exclusive cuts, which are polygon cuts that, if chosen together, would produce a non-manufacturable mask. Some implementations of the invention many use "gadgets" to obtain the T-join solution. Gadgets are a well known technique for addressing T-join problems, as described, for example, in the article entitled "Optimal Phase Conflict Removal for Layout of Dark Field Alternating Phase Shifting Masks", by P Berman, A. B.

Kahng, D. Vidhani, H. Wang and A. Zelikovsky, *IEEE Transactions on Computer-Aided Design*, 19(2) (2000), pp. 175-187, which article is incorporated entirely herein by reference. With these implementations, it is assumed that mutually exclusive cuts can be viewed as edges of the dual graph having a common end node. These implementations of the invention can then ensure that, in the resulting T-join solution, either none or only one of those cuts gets chosen, so that the resultant masks remain manufacturable. This is done on the stage of reduction of the T-join problem to a perfect matching problem by modifying the way that the gadgets are connected: by using the same contact node for the mutually exclusive cut edges. This guarantees that at most one cut will be picked, as in a perfect matching solution no two edges can share a node. If a minimal weight perfect matching algorithm is used, this also provides optimality of the resulting solution.

In step 415, the, the layout design data decomposition tool 301 will output segmented layout design data 317 that has been decomposed using the cut paths selected by the cut path selection module 309. As previously noted, the layout design data decomposition tool 301 may output the segmented layout data 317 as a single set of layout design data including the selected cut paths, as shown in FIG. 11. Alternately or additionally, the cut path selection module 309 may output the segmented layout design data 317 as two or more sets of layout design data.

Figure 12A:
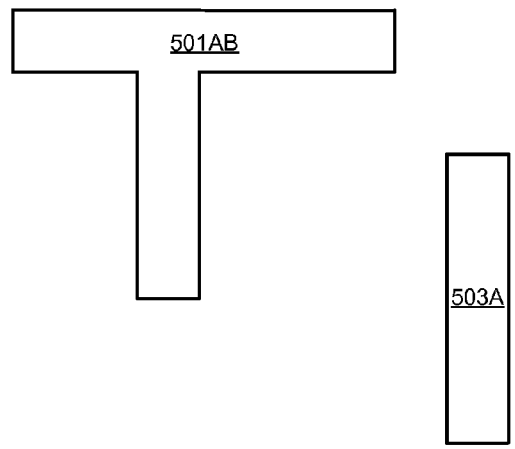
FIGS. 12A and 12B illustrate complementary layout design data segmented using the cut paths selected to decompose the polygons illustrated in FIG. 6 according to various embodiments of the invention.
Figure 12B:
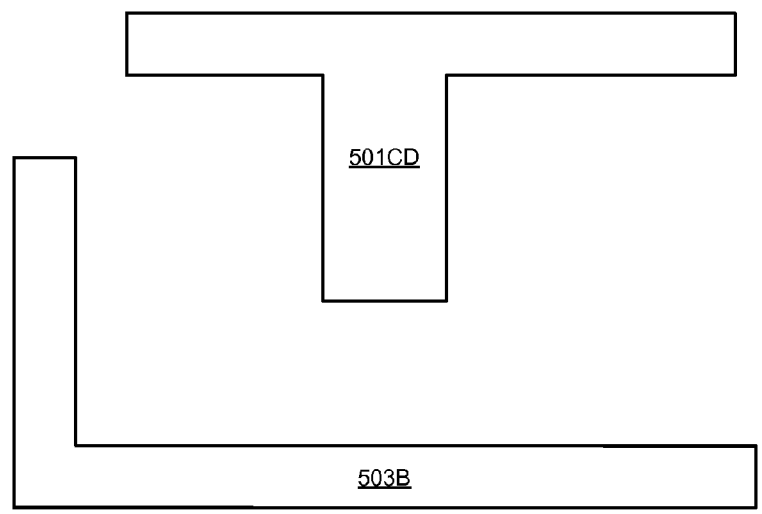

For example, if structures in a layer of material are to be formed using two complementary masks, the segmented layout data 317 may be provided as two complementary sets of layout design data, each of which may be used to form a separate lithographic mask. Thus, the layout design data decomposition tool 301 may provide the polygon segments 501AB and 503A in one set of layout data, as shown in FIG. 12A, while providing the polygon segments 501CD and 503B in a separate set of layout data, as shown in FIG. 12B. As will be appreciated by those of ordinary skill in the art based upon the foregoing discussion, the polygon segments 501AB and 503A may be easily formed using one lithograph mask. Similarly, the polygon segments 501CD and 503B may be formed using a second, different lithograph mask. Moreover, to segment the initial layout design data 315 in this manner required only two cut paths.

CONCLUSION

While specification embodiments of the invention have been shown and described in detail above to illustrate the principles of the invention, it will be understood that the invention may be otherwise embodied without departing from the invention. Thus, while the invention has been described with respect to specific examples, including presently preferred modes of carrying out the invention, those of ordinary skill in the art will appreciate that there are numerous variations and permutations of the above described systems and techniques that fall within the spirit and scope of the invention as set forth in the appended claims.

What is claimed is:

1. A method of segmenting a circuit layout design, comprising;
    employing a computer to designate separated edges in layout design data that should be imaged by separate lithographic masks;
    employing a computer to generate cut paths to cut one or more polygons in the layout design data into a plurality of polygon segments;
    employing a computer to construct a conflict graph, such that
        each polygon segment is represented by a node in the conflict graph,
        nodes representing polygon segments that have separated edges are connected by a separation edge,
        each generated cut path is represented by a cut path edge, and
        nodes representing abutting polygon segments are connected by a corresponding cut path edge;
    employing a computer to construct a dual graph for the conflict graph, such that
        the dual graph contains dual graph separation edges corresponding to the separation edges of the conflict graph, and
        the dual graph contains dual graph cut path edges corresponding to the cut path edges of the conflict graph;
    employing a computer to select dual graph cut edges in the dual graph by
        identifying nodes in the dual graph having an odd number of incident dual graph separation edges, and
        determining the dual graph cut path edges that make up the dual graph cut path edge minimum-weight T-join of the identified nodes; and
    employing a computer to add the cut paths represented by the selected dual graph cut path edges to the layout design data.

2. The method recited in claim 1, further comprising employing a computer to determine the dual graph cut path edges that make up the dual graph cut path edge minimum-weight T-join of the identified nodes by
    assigning a first weight to each of the dual graph cut path edges; and
    assigning a second weight to each of the dual graph separation edges, the second weight being substantially larger than the first weight.

3. The method recited in claim 2, wherein the first weight has a value of zero and the second weight has a value of infinity.

4. The method recited in claim 1, further comprising designating the separated edges based upon provided separation directive data.

5. The method recited in claim 4, wherein the separation directive data includes separation polygons abutting separated edges.

6. The method recited in claim 5, wherein each separation polygon abuts only two separated edges.

7. The method recited in claim 1, wherein the cut paths are generated from a library of cut types.

8. The method recited in claim 1, further comprising:
    forming a subgraph of the conflict graph by removing the cut path edges from the conflict graph;
    determining if the subgraph of the conflict graph is bipartite; and
    if the subgraph of the conflict graph is bipartite, determining that the layout design data can be decomposed.

9. A circuit layout design segmentation tool, comprising:
    a separation directive designation module configured to designate separated edges in layout design data that should be imaged by separate lithographic masks;
    a segmentation module configured to generate cut paths to cut one or more polygons in the layout design data into a plurality of polygon segments;
    a graphing module configured to construct a conflict graph and a dual graph for the conflict graph, such that
        each polygon segment is represented by a node in the conflict graph, nodes in the conflict graph representing polygon segments that have separated edges are connected by a separation edge in the conflict graph, each generated cut path is represented by a cut path edge in the conflict graph, and nodes in the conflict graph representing abutting polygon segments are connected by a corresponding conflict graph cut path edge;

the dual graph contains dual graph separation edges corresponding to the separation edges of the conflict graph, and the dual graph contains dual graph cut path edges corresponding to the cut path edges of the conflict graph;

a cut path edge selection module configured to select dual graph cut edges in the dual graph by identifying nodes in the dual graph having an odd number of incident dual graph separation edges, determining the dual graph cut path edges that make up the dual graph cut path edge minimum-weight T-join of the identified nodes, and add the cut paths represented by the selected dual graph cut path edges to the layout design data.

10. The circuit layout design segmentation tool recited in claim 9, wherein the cut path edge selection module is configured to determine the dual graph cut path edges that make up the dual graph cut path edge minimum-weight T-join of the identified nodes by assigning a first weight to each of the dual graph cut path edges; and assigning a second weight to each of the dual graph separation edges, the second weight being substantially larger than the first weight.

11. The circuit layout design segmentation tool recited in claim 10, wherein the first weight has a value of zero and the second weight has a value of infinity.

12. The circuit layout design segmentation tool recited in claim 9, wherein the separation directive designation module is configured to designate the separated edges based upon provided separation directive data.

13. The circuit layout design segmentation tool recited in claim 12, wherein the separation directive data includes separation polygons abutting separated edges.

14. The circuit layout design segmentation tool recited in claim 13, wherein each separation polygon abuts only two separated edges.

15. The circuit layout design segmentation tool recited in claim 9, wherein the segmentation module is configured to generate the cut paths from a library of cut types.

16. The circuit layout design segmentation tool recited in claim 9, further comprising a decomposition feasibility module configured to form a subgraph of the conflict graph by removing the cut path edges from the conflict graph;

determine if the subgraph of the conflict graph is bipartite; and if the subgraph of the conflict graph is bipartite, determine that the layout design data can be decomposed.

17. A computer-readable storage medium having computer-executable instructions stored thereon for performing the method comprising:

designating separated edges in layout design data that should be imaged by separate lithographic masks;

generating cut paths to cut one or more polygons in the layout design data into a plurality of polygon segments;

constructing a conflict graph, such that each polygon segment is represented by a node in the conflict graph, nodes representing polygon segments that have separated edges are connected by a separation edge, each generated cut path is represented by a cut path edge, and nodes representing abutting polygon segments are connected by a corresponding cut path edge;

constructing a dual graph for the conflict graph, such that the dual graph contains dual graph separation edges corresponding to the separation edges of the conflict graph, and the dual graph contains dual graph cut path edges corresponding to the cut path edges of the conflict graph;

selecting dual graph cut edges in the dual graph by identifying nodes in the dual graph having an odd number of incident dual graph separation edges, and determining the dual graph cut path edges that make up the dual graph cut path edge minimum-weight T-join of the identified nodes; and adding the cut paths represented by the selected dual graph cut path edges to the layout design data.

18. The computer-readable storage medium recited in claim 17, wherein the computer-executable instructions include instructions for determining the dual graph cut path edges that make up the dual graph cut path edge minimum-weight T-join of the identified nodes by assigning a first weight to each of the dual graph cut path edges; and assigning a second weight to each of the dual graph separation edges, the second weight being substantially larger than the first weight.

19. The computer-readable storage medium recited in claim 18, wherein the computer-executable instructions include instructions for determining the dual graph cut path edges that make up the dual graph cut path edge minimum-weight T-join of the identified nodes assign the first weight a value of zero and assign the second weight has a value of infinity.

20. The computer-readable storage medium recited in claim 17, wherein the computer-executable instructions include instructions for designating the separated edges based upon provided separation directive data.

21. The computer-readable storage medium recited in claim 20, wherein the separation directive data includes separation polygons abutting separated edges.

22. The computer-readable storage medium recited in claim 21, wherein each separation polygon abuts only two separated edges.

23. The computer-readable storage medium recited in claim 17, wherein the computer-executable instructions include instructions for generating the cut paths from a library of cut types.

24. The computer-readable storage medium recited in claim 17, wherein the computer-executable instructions include instructions for forming a subgraph of the conflict graph by removing the cut path edges from the conflict graph;

determining if the subgraph of the conflict graph is bipartite; and if the subgraph of the conflict graph is bipartite, determining that the layout design data can be decomposed.

* * * * *